Patented Jan. 19, 1932

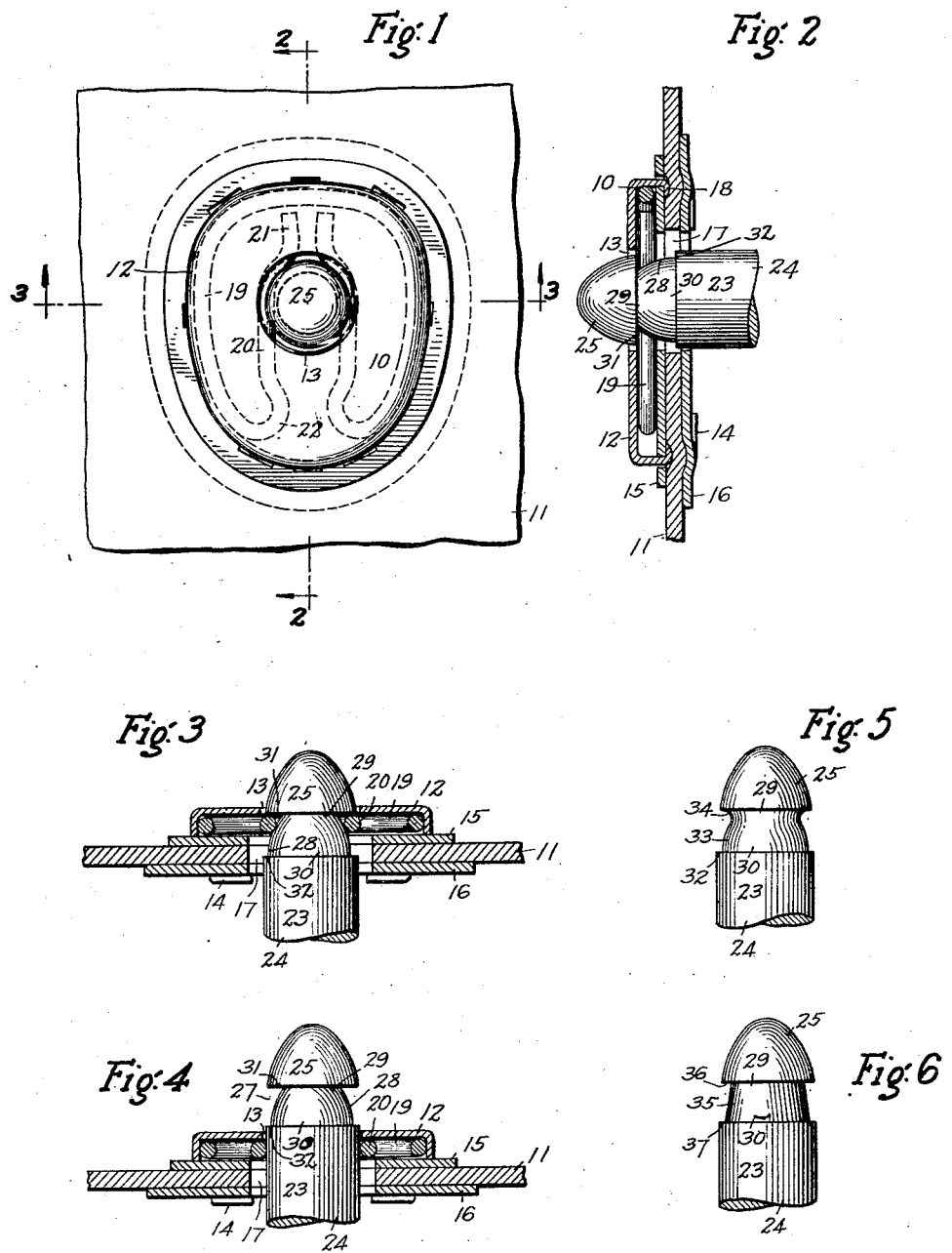

1,841,630

UNITED STATES PATENT OFFICE

LUES REITER, OF PROVIDENCE, RHODE ISLAND

CURTAIN FASTENER

Application filed July 8, 1930. Serial No. 466,477.

This invention relates to stud and socket fasteners and particularly, to the type of fasteners known as three side lock fasteners, wherein one fastener element such as the stud is secured to a stationary part such as the body of an automobile, and another element such as the socket is secured to a movable part, such as a curtain or similar part adapted to be separably attached in place.

In three side lock fasteners, the fastener elements cannot readily be separated except by a tilting movement applied at a particular side. Previously known types of studs for such fasteners allow the stud head to pass too readily through the socket so as at times, to project unduly therethrough, or the studs are else so shaped as to be so resistant to passage through the socket, that considerable difficulty is often experienced in projecting the stud through the socket a sufficient distance to receive more than one socket.

My invention contemplates the provision of a stud so shaped that the undue movement of the stud through the socket is resisted without interfering with the ease of separation of the fastener parts, and without preventing the passage of the stud through the socket a distance sufficient to enter another socket.

My invention further contemplates the provision of a stud so shaped as to be automatically maintained in proper normal operative position in the socket to prevent rattling, and dissipating the excess force exerted upon the socket to fasten it to the stud whereby the socket is normally halted in its proper position relatively to the stud.

The various objects of my invention will be clear from the description which follows, and from the drawings, in which, Fig. 1 is a front elevation of my improved fastener as it appears applied to a curtain or similar sheet of material and in assembled position.

Fig. 2 is a vertical section of the same, taken on the line 2—2 of Fig. 1.

Fig. 3 is a horizontal section of the same, taken on the line 3—3 of Fig. 1.

Fig. 4 is a similar view of the same, showing how the stud may, under slightly excess pressure, be forced past its normal limiting position in order to permit of the reception of an additional socket.

Fig. 5 is an elevational view of a modified form of the stud end, showing, particularly, the shape of the groove of the stud, and Fig. 6 is a similar view of another modified form of the stud showing another shape of the groove.

In that practical embodiment of my invention which I have illustrated by way of example, the socket assembly 10 is suitably secured in the usual manner to a member of sheet material such as the automobile curtain 11. The socket assembly comprises the casing 12, having an aperture as 13 therein for the passage of the stud head, and provided with prongs as 14 extending from the casing wall and adapted to pass through the curtain 11 and through suitable apertures in the front plate 15 and in the rear plate 16. The sheet or curtain material 11, it will be understood, is interposed between the plates 15 and 16, and is preferably provided with an opening as 17 for the passage of the stud. The front plate 15 is normally held to the casing 12 as by means of suitable integral clips or projections 18 extending from the side walls of the casing, and turned over on to the rear face of the plate. Interposed between the front plate 15 and the casing 12 is the spring 19 made preferably of round spring wire and suitably shaped to conform in its greater part to the peripheral shape of the casing walls.

The spring 19 is provided with a pair of substantially parallel diametrically arranged stud gripping jaws as 20. The ends 21 of the jaws 20, under the contracting influence of the remainder of the spring, are normally in contact but may yield about the bends 22 thereof under the pressure of the stud head, as is well known.

The stud 23 may be secured in any suitable manner to the part to which the socket or the sheet 11 is to be separably attached. Any well known means such as eyelets, rivets, screws, bolts or the like may be provided at the end of the shank 24 of the stud 23, for securing it in place and such means being well known in the art, no description nor additional disclosure thereof is deemed necessary. The head 25 of the stud is tapered and preferably conoidal in shape, and is separated from the shank by means of a suitably shaped circumferential groove 27. The inner wall 28 of the groove thus joins the head and the shank of the stud.

As illustrated in Figs. 2, 3 and 4, the wall 28 of the groove is tapered, being preferably of conoidal shape. It is of less diameter at one end 29 than it is at the other end 30. The diameter of the end 30 is less than the diameter of the shank 24 but greater than the diameter of the end 29. In the position of the stud shown in Figs. 2 and 3, the spring jaws 20 rest in the wider end of the groove in contact with the shoulder 31 of the stud head 25, and in contact with the groove wall 28 at a point spaced somewhat from the shoulder. This position is the normal position of the stud since the stud is forced into said position owing to the tendency of the spring portions 20 to contract. Contraction or movement of the jaws 20 towards each other, causes the spring to act upon the wall 28 in such a manner as to force the socket in a direction toward the deeper or wider end of the groove or the narrower end of the groove wall until the movement of the socket is halted by the engagement of said spring portions with the shoulder 31, when further movement of the socket is prevented. It will be noted that the depth of the groove at the end 29 is such that the wire jaws 20 extend slightly beyond or outwardly of the stud head for the purpose of allowing the jaws to be spread, and the stud head disengaged therefrom when the socket and stud are relatively tilted in the proper direction.

To attach the socket to the stud, the stud head is passed through the aperture of the plate 16 and through the aperture 17 into engagement with the spring jaws 20. As the spring jaws are forced on the stud head, said jaws are spread by the conoidal stud head 25 until the jaws pass the shoulder 31 whereupon the jaws 20 move toward each other and contract into engagement with the wall 28 of the groove. Since, however, considerable force is required to push the socket past the stud head, the socket continues to move for a short distance under the manual pressure applied thereto, so that the spring, instead of stopping to rest against the shoulder 31 as it should, moves along the tapered wall 28 until it comes in contact with the shoulder 32. Said shoulder is of less depth than the shoulder 31 but offers sufficient resistance to further relative movement of the socket and stud to halt movement of the spring past said shoulder.

I have found that the distance between the shoulders 29 and 30 should be approximately two to three times the diameter of the wire of which the spring 19 is made. The excess force exerted in assembling the stud and socket is partly absorbed in spreading of the spring jaws 20 apart due to the shape of the groove wall 28, so that as the spring reaches the shoulder 32, the greater part of the assembling force has been absorbed.

The shoulder 32 therefore need be only about half of the diameter of the wire of the spring 19 in order to adequately halt the relative movement of the stud and socket at the proper point.

It will be seen, however, from Fig. 4, that if considerable additional force is exerted upon either the stud or the socket more than is required to assemble them, the spring 19 may nevertheless be forced past the shoulder 32 if desired. Due to said shoulder 32, the force required for this purpose is much greater than that required merely to assemble the stud and socket into their operative positions. As illustrated in Fig. 5, the groove wall 33 is of slightly different shape, terminating as at 34 in a concave portion of substantially the diameter of the wire 19 so that said wire may fit thereinto, the remainder of the groove wall being preferably substantially conoidal. As illustrated in Fig. 6, the groove wall 35 is of conical shape instead of conoidal shape, the spreading action of the wall upon the spring 19 being thereby more rapid. In the forms shown in Figs. 3 and 6, the shoulders 31, 32, 36 and 37 lie preferably in planes at substantially right angles to the axis of the stud.

It will be understood that the groove wall may be given shapes other than those illustrated as will be obvious to those skilled in the art provided that that end of said wall adjacent the stud head is of less diameter than the other end of said wall which is adjacent the shoulder 32 or 37. Owing to the tapered shape of the wall, however, it will be understood that if the spring 19 becomes arranged for any reason at any point in the groove other than in its normal position, the parts, when released, will tend to move automatically into their normal positions provided that the socket is not moved under excess pressure into the position shown in Fig. 4.

In other words, should the socket illustrated in Fig. 4 be raised until the spring shown passes the shoulder 32, the socket when released will automatically move upwardly until the shoulder 31 contacts with the spring jaws and without necessity for any further movement of the parts by the user.

The socket may, however, be removed from the stud in the usual manner; that is, as viewed in Fig. 2, by moving the lower end of the socket toward the left and thereby causing the shoulder portion 31 to spread the spring jaws 21 and 20. Tilting of the socket relatively to the stud at any other point, however, will fail to spread said jaws.

It will be seen that I have provided simple and effective means whereby the stud of a three side lock fastener is automatically maintained in its proper operative position without interfering with the separable action thereof, that the normal force of the securing movement is insufficient to cause the stud to project too far through the socket, sufficient play being provided in the stud groove for absorbing such excess force, and the limiting shoulders on the stud and the depth of the groove being so proportioned as to carry out the purposes of the invention effectively.

While I have shown and described a specific embodiment of my invention, I do not wish to be understood as limiting myself thereto but intend to claim my invention as broadly as may be permitted by the state of the prior art and the terms of the appended claims.

I claim:

1. A stud and socket fastener comprising a socket member including a casing, and stud-engaging spring wire jaws mounted in the casing, and a stud for engaging said jaws, terminating in a conoidal head and provided with a circumferential groove adjacent said head, and having a shank, the wall of the groove being tapered to provide a pair of spaced shoulders of different widths forming the ends of the groove, and the length of the groove being at least twice the diameter of the wire of said jaws to spread the jaws as the jaws are moved in the groove from the wider to the narrower shoulder, and to permit the jaws to contract to move the socket automatically in the groove toward the wider shoulder on the release of the socket when the jaws are nearer the narrower shoulder, the narrower shoulder lying in a plane perpendicular to the axis of the stud and thereby preventing movement of the jaws on to the shank of the stud on the exertion of the normal force needed for assembling the stud and socket, but not preventing such movement on the exertion of slightly greater force.

2. A stud and socket fastener comprising an apertured socket including a casing, means for securing said casing to a sheet of material and a length of spring wire arranged in said casing and having spring jaws crossing the aperture of the socket, and a circumferentially grooved stud having a conoidal head, a shank, the diameter of which is substantially that of the greatest diameter of the head, and having a wall joining the shank and the head and forming the innermost part of the groove, said wall being of less diameter adjacent the head than it is at a point adjacent the shank, and the greatest diameter of said wall being less than the diameter of the shank to provide a shoulder of substantial width less than the diameter of the spring jaws connecting the wall and the surface of the shank and providing a second shoulder adjacent the head, of slightly less width than the diameter of said spring jaws, said second shoulder halting the relative movement of the jaws and the stud during the normal assembly of the stud and the socket, but being of insufficient width to prevent the jaws from being moved forcibly past said shoulder to project the stud from the socket a sufficient distance for the reception by the stud of another similar socket.

3. In a three side lock fastener, an apertured socket, a length of spring wire arranged in said socket and having spring jaws crossing the aperture of the socket, and a circumferentially grooved stud for the socket, the stud groove having a wall arranged coaxially of the stud and being of less diameter at the end adjacent the head of the stud than at the other end, the diameter of said other end being less than the outer diameter of the stud beyond said groove, to form a shoulder extending inwardly from the surface of the stud, in a plane substantially perpendicular to the axis of the stud, to said other end of the wall a distance less than the diameter of the wire, and the length of the groove being at least twice as great as the diameter of said spring wire.

4. In a stud, a conoidal head, a shank, the diameter of which is substantially the same as the greatest diameter of the head, and a wall joining the shank and the head, said wall being of less diameter at the extremity thereof adjacent the head than at the other extremity thereof, and the greatest diameter of said wall being at said other extremity and defined by a circle of less diameter than the diameter of the shank to provide a shoulder of substantial width connecting the circle forming said other extremity of the wall and the surface of the shank, the outermost diameter of the shoulder being equal to the diameter of the shank, and the surface of the shoulder being perpendicular to the axis of the stud.

5. The combination with a round spring wire element of a socket, of a stud having a circumferential groove provided with a bottom wall intermediate of the ends of the stud, the bottom wall of the groove being tapered and providing a shoulder at each end thereof, one of the shoulders being of greater width than the other, both of said shoulders being of less width than the diameter of said wire, and the narrower shoulder lying in a plane substantially perpendicular to the axis of the stud and serving as a stop for halting assembling movement of the wire element on the stud.

6. In a stud, a conoidal head, a shank having a groove at one end thereof separating the head from the remainder of the shank, the wall of said groove being conoidal for the greater part of its length and terminating in a concave fillet adjacent the head to form a shoulder adapted to receive and fit a round spring wire, the various diameters of said wall differing in size from each other, and all of said diameters being of less diameter than that of the shank, and a shoulder comprising a substantially flat surface defined by substantially sharp edges at that end of the wall adjacent the shank.

7. In a stud, a conoidal head and a shank, said head and shank being separated by a groove of substantially the same length as that of said head, the wall of the groove being conical and the greatest diameter of said wall being defined by an internally recessed corner of a diameter less than the diameter of the shank.

8. In a stud, a conoidal head and a shank, said head and shank being separated by a groove, the wall of said groove being convex and of greater diameter at one end adjacent the shank than at the other adjacent the head to form shoulders of different innermost diameters arranged in planes at right angles to the axis of the stud.

9. In a stud, a tapered head and a cylindrical shank, said head and shank being separated by a groove, the wall of said groove being of greatest diameter adjacent the shank and of lesser diameter at points intermediate the head and the shank to form a pair of shoulders, one adjacent the head and the other adjacent the shank, said shoulders being of different widths, and the wider shoulder being arranged in a plane at substantially right angles to the axis of the stud.

10. In a stud, a tapered head and a cylindrical shank, and a portion integral with and connecting said head and shank, the outer surface of the connecting portion being of less diameter throughout than that of the shank and the end thereof nearer the head being of less diameter than the end thereof nearer the shank, a reentrant surface extending from the surface of the shank to the last-mentioned end, and a circular edge defining the juncture of said reentrant surface with said end.

LUES REITER.